(12) United States Patent
Farah et al.

(10) Patent No.: US 9,587,514 B2
(45) Date of Patent: Mar. 7, 2017

(54) VANE INSERTABLE TIE RODS WITH KEYED CONNECTIONS

(75) Inventors: Jorge I. Farah, Hartford, CT (US); Paul K. Sanchez, New Britian, CT (US)

(73) Assignee: United Technologies Corporation, Hartford, CT (US)

(*) Notice: Subject to any disclaimer, the term of this patent is extended or adjusted under 35 U.S.C. 154(b) by 1067 days.

(21) Appl. No.: 13/548,581

(22) Filed: Jul. 13, 2012

(65) Prior Publication Data
US 2014/0013770 A1   Jan. 16, 2014

(51) Int. Cl.
F02C 7/20 (2006.01)
B21K 3/00 (2006.01)
F01D 25/16 (2006.01)
F01D 9/06 (2006.01)

(52) U.S. Cl.
CPC ............ F01D 25/16 (2013.01); F01D 9/065 (2013.01); F02C 7/20 (2013.01); F05D 2260/31 (2013.01); Y10T 29/49231 (2015.01)

(58) Field of Classification Search
CPC ....... F01D 25/16; F01D 25/162; F01D 25/164
USPC .................................................... 60/796, 799
See application file for complete search history.

(56) References Cited

U.S. PATENT DOCUMENTS

| 2,829,014 A * | 4/1958 | May .................. F01D 25/162 384/584 |
| 2,919,888 A | 1/1960 | Simmons |
| 3,261,587 A | 7/1966 | Rowley |
| 3,403,889 A | 10/1968 | Ciokajlo |
| 4,369,016 A | 1/1983 | Dennison |
| 4,478,551 A | 10/1984 | Honeycutt, Jr. et al. |
| 4,691,889 A * | 9/1987 | Richards ............... F16B 7/0413 16/38 |
| 4,979,872 A | 12/1990 | Myers et al. |
| 4,987,736 A * | 1/1991 | Ciokajlo ................. F01D 9/065 415/138 |
| 5,011,080 A | 4/1991 | Barcza et al. |

(Continued)

FOREIGN PATENT DOCUMENTS

EP   1149986 A2   10/2001
EP   1655457 B1   1/2008

(Continued)

OTHER PUBLICATIONS

The International Search Report mailed for PCT International Application No. PCT/US2013/050265, mailed Oct. 8, 2013, 9 pages.

(Continued)

*Primary Examiner* — Thomas Denion
*Assistant Examiner* — Mickey France
(74) *Attorney, Agent, or Firm* — Kinney & Lange, P.A.

(57) ABSTRACT

A gas turbine engine includes a combustor, a first turbine section in fluid communication with the combustor, a second turbine section in fluid communication with the first turbine section, and a mid-turbine frame located axially between the first turbine section and the second turbine section. The mid-turbine frame includes a first frame case, a second frame case, a vane positioned between the first frame case and the second frame case, and a spoke extending through the vane and connecting the first frame case to the second frame case. The spoke includes a tie rod having a first end connected to the first frame case at a keyed connection.

18 Claims, 7 Drawing Sheets

(56) References Cited

U.S. PATENT DOCUMENTS

| | | |
|---|---|---|
| 5,160,251 A | 11/1992 | Ciokajlo |
| 5,272,869 A | 12/1993 | Dawson et al. |
| 6,095,738 A * | 8/2000 | Selle .................. B21D 53/24 |
| | | 411/183 |
| 7,195,447 B2 | 3/2007 | Moniz et al. |
| 7,610,763 B2 | 11/2009 | Somanath et al. |
| 8,061,969 B2 | 11/2011 | Durocher et al. |
| 8,091,371 B2 | 1/2012 | Durocher et al. |
| 8,099,962 B2 | 1/2012 | Durocher et al. |
| 2006/0093465 A1 | 5/2006 | Moniz et al. |
| 2008/0134687 A1 | 6/2008 | Kumar et al. |
| 2009/0288356 A1* | 11/2009 | Fitzpatrick .............. E02D 27/00 |
| | | 52/295 |
| 2010/0040462 A1 | 2/2010 | Praisner et al. |
| 2010/0132370 A1 | 6/2010 | Durocher et al. |
| 2010/0132371 A1 | 6/2010 | Durocher et al. |
| 2010/0132372 A1 | 6/2010 | Durocher et al. |
| 2010/0132373 A1* | 6/2010 | Durocher ................ F01D 9/065 |
| | | 60/796 |
| 2010/0132376 A1 | 6/2010 | Durocher et al. |
| 2010/0202873 A1* | 8/2010 | Andrew .................. F01D 5/187 |
| | | 415/116 |
| 2010/0275572 A1 | 11/2010 | Durocher et al. |
| 2010/0303610 A1 | 12/2010 | Wang et al. |
| 2011/0079019 A1 | 4/2011 | Durocher et al. |
| 2011/0081237 A1 | 4/2011 | Durocher et al. |
| 2013/0011242 A1* | 1/2013 | Beeck .................... F01D 25/28 |
| | | 415/142 |

FOREIGN PATENT DOCUMENTS

| | | |
|---|---|---|
| GB | 2242711 A | 10/1991 |
| JP | 60043105 A | 3/1985 |

OTHER PUBLICATIONS

The European Search Report mailed Jun. 22, 2015 for European Application No. 13816247.4.

* cited by examiner

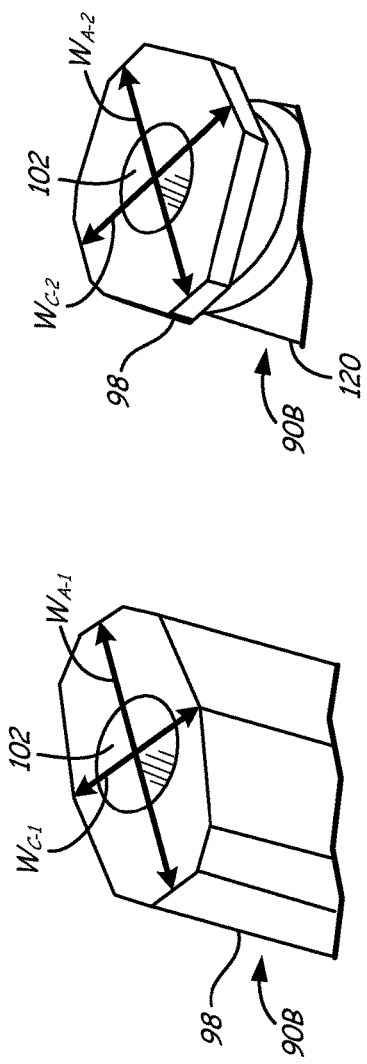
Fig. 4D
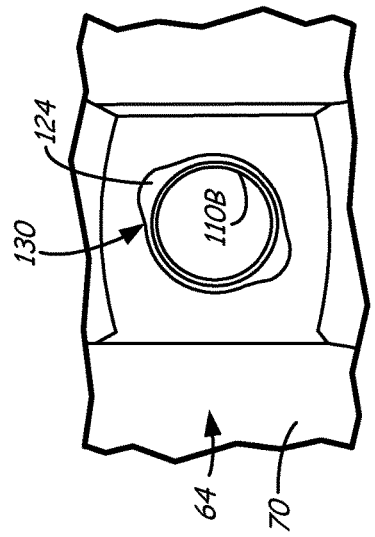
Fig. 4E
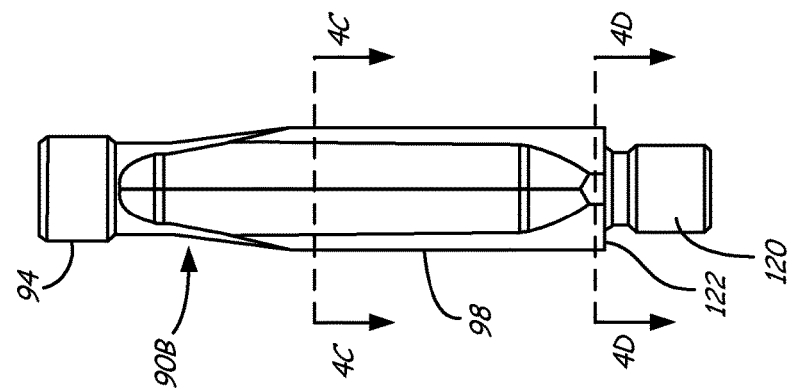
Fig. 4C
Fig. 4B

VANE INSERTABLE TIE RODS WITH KEYED CONNECTIONS

BACKGROUND

The present disclosure relates generally to a gas turbine engine, and in particular to a mid-turbine frame (MTF) included in a gas turbine engine.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY

A gas turbine engine includes a combustor, a first turbine section in fluid communication with the combustor, a second turbine section in fluid communication with the first turbine section, and a mid-turbine frame located axially between the first turbine section and the second turbine section. The mid-turbine frame includes a first frame case, a second frame case, a vane positioned between the first frame case and the second frame case, and a spoke extending through the vane and connecting the first frame case to the second frame case. The spoke includes a tie rod having a first end connected to the first frame case at a keyed connection.

Another embodiment is a method of assembling a mid-turbine frame for use in a gas turbine engine axially aft of a high-pressure turbine and fore of a low-pressure turbine. The method includes inserting at least a first tie rod through at least a first airfoil, positioning first and second frame cases on opposite sides of the airfoil such that one of the first and second frame cases is radially outward of the airfoil and the other of the first and second frame cases is radially inward of the airfoil, and attaching a first end of the tie rod to the first frame case at a keyed connection.

BRIEF DESCRIPTION OF THE DRAWINGS

FIG. 4B is a side view of a tie rod of the mid-turbine frame (MTF) of FIG. 4A.

FIG. 4C is a sectional view of the tie rod taken along line 4C-4C of FIG. 4B.

FIG. 4D is a sectional view of the tie rod taken along line 4D-4D of FIG. 4B.

FIG. 4E is a top view of the inner frame case of the mid-turbine frame (MTF) of FIG. 4A.

DETAILED DESCRIPTION

Figure 1:
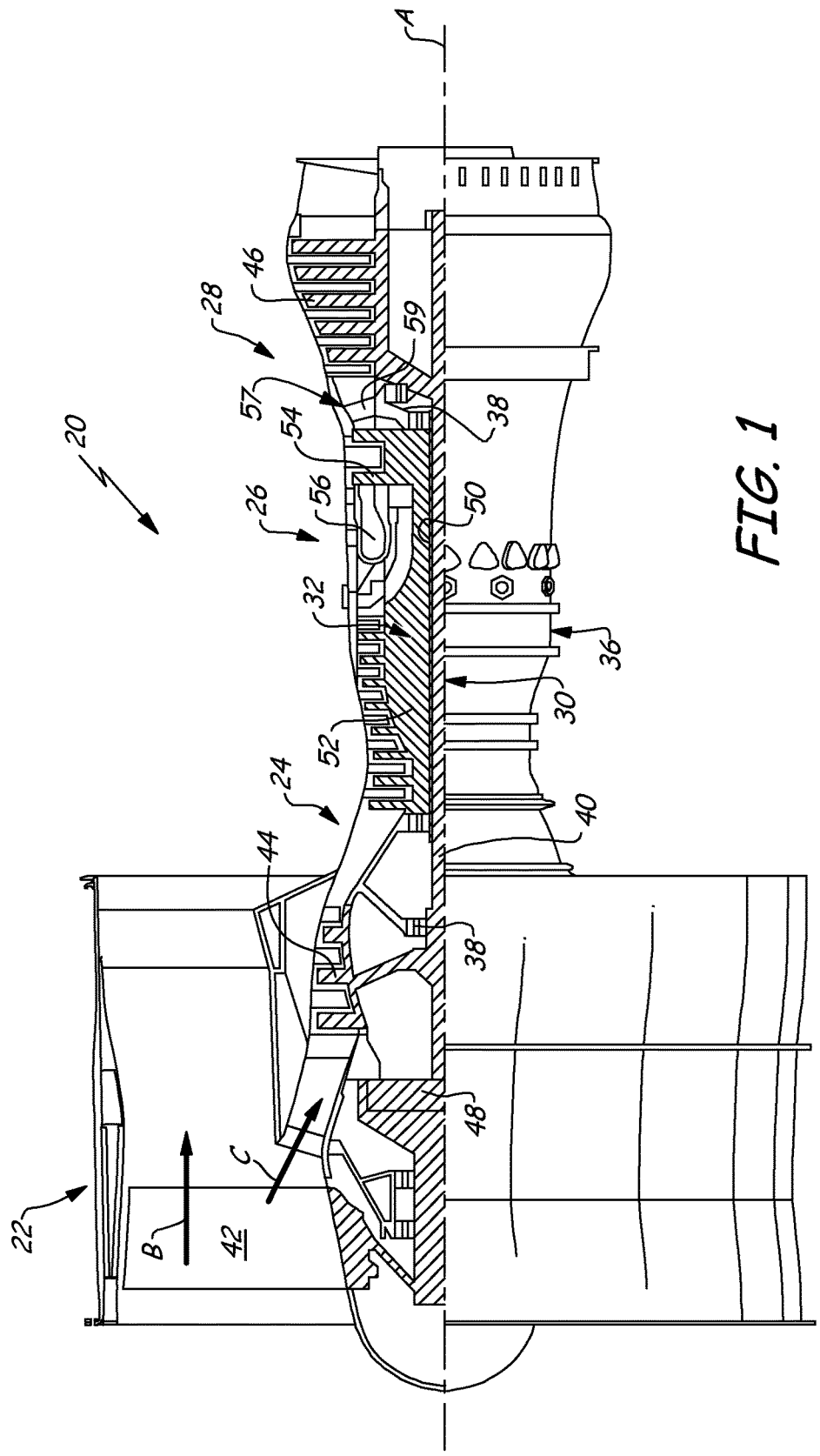
FIG. 1 is a schematic view of a gas turbine engine according to an embodiment of the present invention.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 57 of engine static structure 36 is arranged generally between high pressure turbine 54 and low pressure turbine 46. Mid-turbine frame 57 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 57 includes airfoils/vanes 59, which are in the core airflow path and function as an inlet guide vane for low pressure turbine 46. Utilizing vanes 59 of mid-turbine frame 57 as inlet guide vanes for low pressure turbine 46 decreases the length of low pressure turbine 46 without increasing the axial length of mid-turbine frame 57. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ("TSFC")"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate fan section 22 and therefore the relationship between the number of turbine rotors 34 in low pressure turbine 46 and number of blades 42 in fan section 22 disclose an example gas turbine engine 20 with increased power transfer efficiency.

Figure 2A:
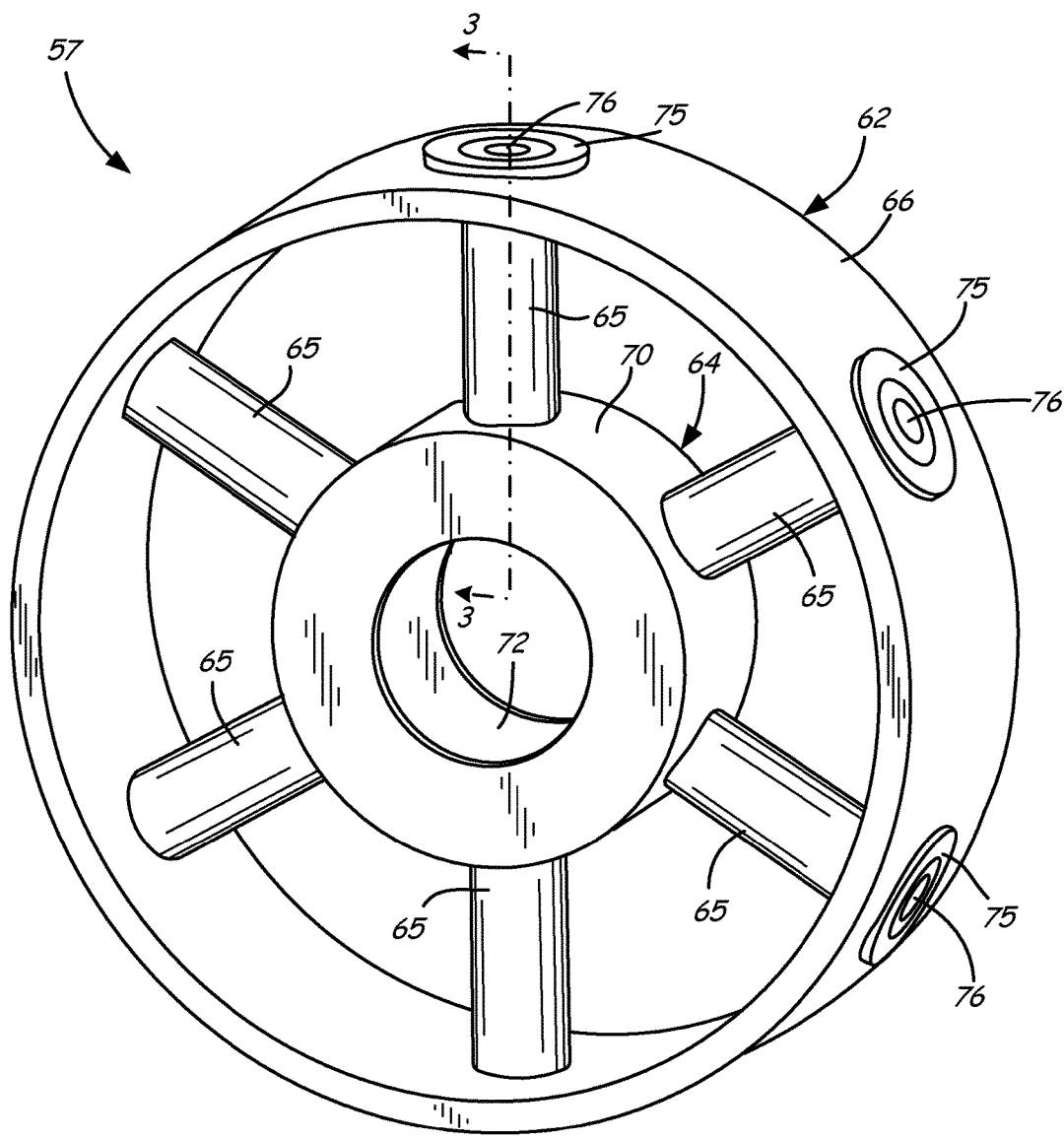
FIG. 2A is a schematic perspective view of one embodiment of a mid-turbine frame (MTF) located in the gas turbine engine.

FIG. 2A is a schematic perspective view of one embodiment of mid turbine frame (MTF) 57. The schematic view shown in FIG. 2A is high level conceptual view and is intended to illustrate relative positioning of various components, but not actual shape of various components. MTF 57 includes outer frame case 62, inner frame case 64, and a plurality of hollow spokes 65. Outer frame case 62 includes outer diameter surface 66. Inner frame case 64 includes outer diameter surface 70 and inner diameter surface 72. In the embodiment shown in FIG. 2A, six hollow spokes 65 are distributed evenly around the circumference of radial inner case 64 to provide structural support between inner frame case 64 and outer frame case 62. In the illustrated embodiment, each of the hollow spokes 65 is directly opposite (i.e. 180 degrees from) another of the hollow spokes 65. In alternative embodiments, MTF 57 can have an even number of hollow spokes greater than or less than six.

Inner frame case 64 supports the rotor assembly via bearing assemblies 38 (shown in FIG. 1), and distributes the force from inner frame case 64 to outer frame case 62 via the plurality of hollow spokes 65. Attachment of hollow spokes 65 to outer frame case 62 is provided at a plurality of bosses 75 located circumferentially around outer diameter surface 66 of outer frame case 62. In one embodiment, attachment of hollow spokes 65 at bosses 75 may be secured by a retaining nut (shown in FIGS. 3A and 4A) that allows hollow spokes 65 to be tensioned. Apertures 76 formed in each of the plurality of bosses 75 allow cooling air to be distributed into a hollow portion of each of the hollow spokes 65. In this way, cooling airflow is directed from the outer diameter through the hollow portions of cooled spokes 65 towards inner frame case 64. This cooling air can function to cool hollow spokes 65 and also to cool components radially inward of inner frame case 64, such as bearings 38.

Figure 2B:
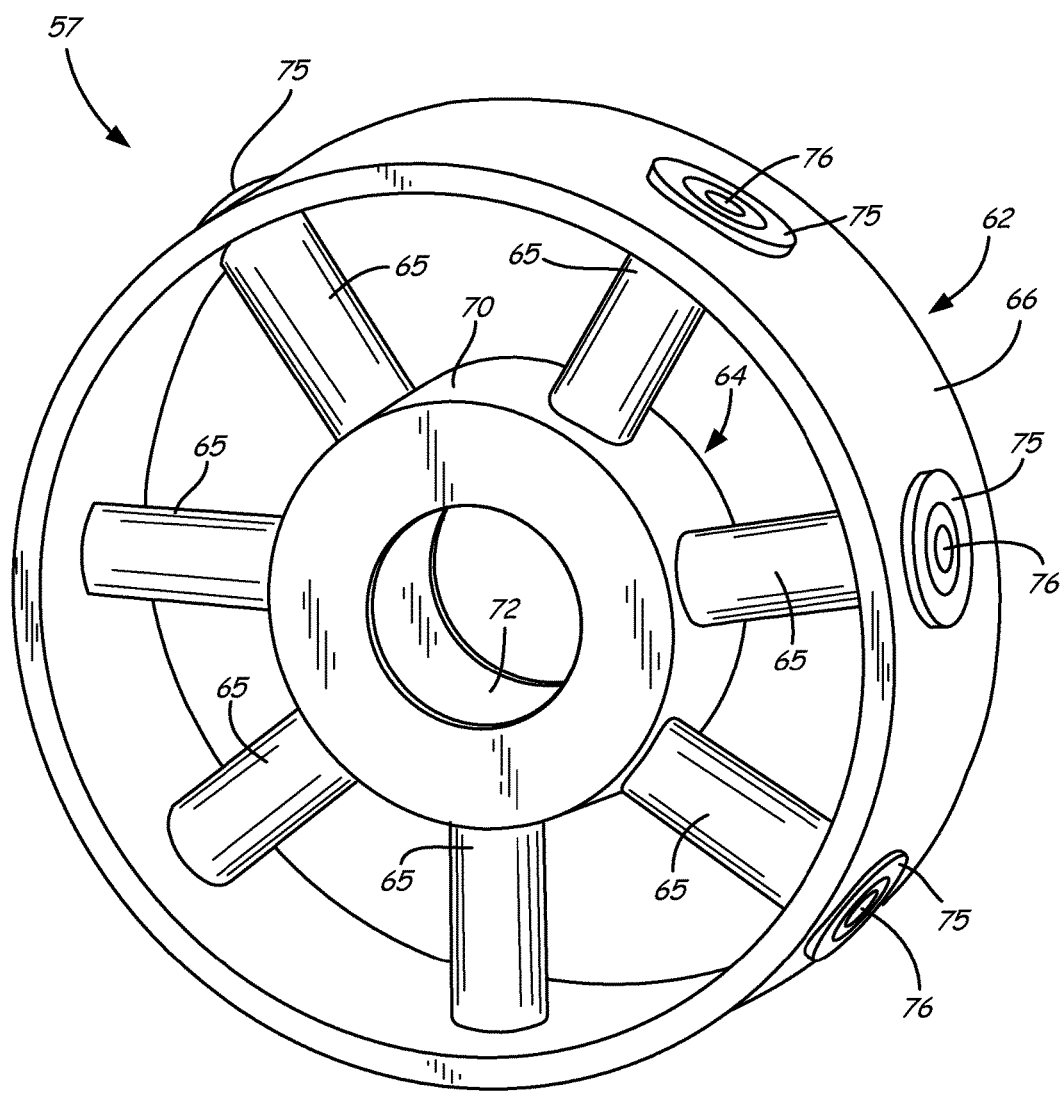
FIG. 2B is a schematic perspective view of an alternative embodiment of the mid-turbine frame (MTF) of FIG. 2A.

FIG. 2B is a schematic perspective view of another embodiment of mid turbine frame (MTF) 57. The schematic view shown in FIG. 2B is high level conceptual view and is intended to illustrate relative positioning of various components, but not actual shape of various components. In the embodiment shown in FIG. 2B, seven hollow spokes 65 are distributed evenly around the circumference of radial inner case 64 to provide structural support between inner frame case 64 and outer frame case 62. In the illustrated embodiment, no two hollow spokes 65 are directly opposite one-another. In alternative embodiments, MTF 57 can have an odd number of hollow spokes greater than or less than seven.

Figure 3A:
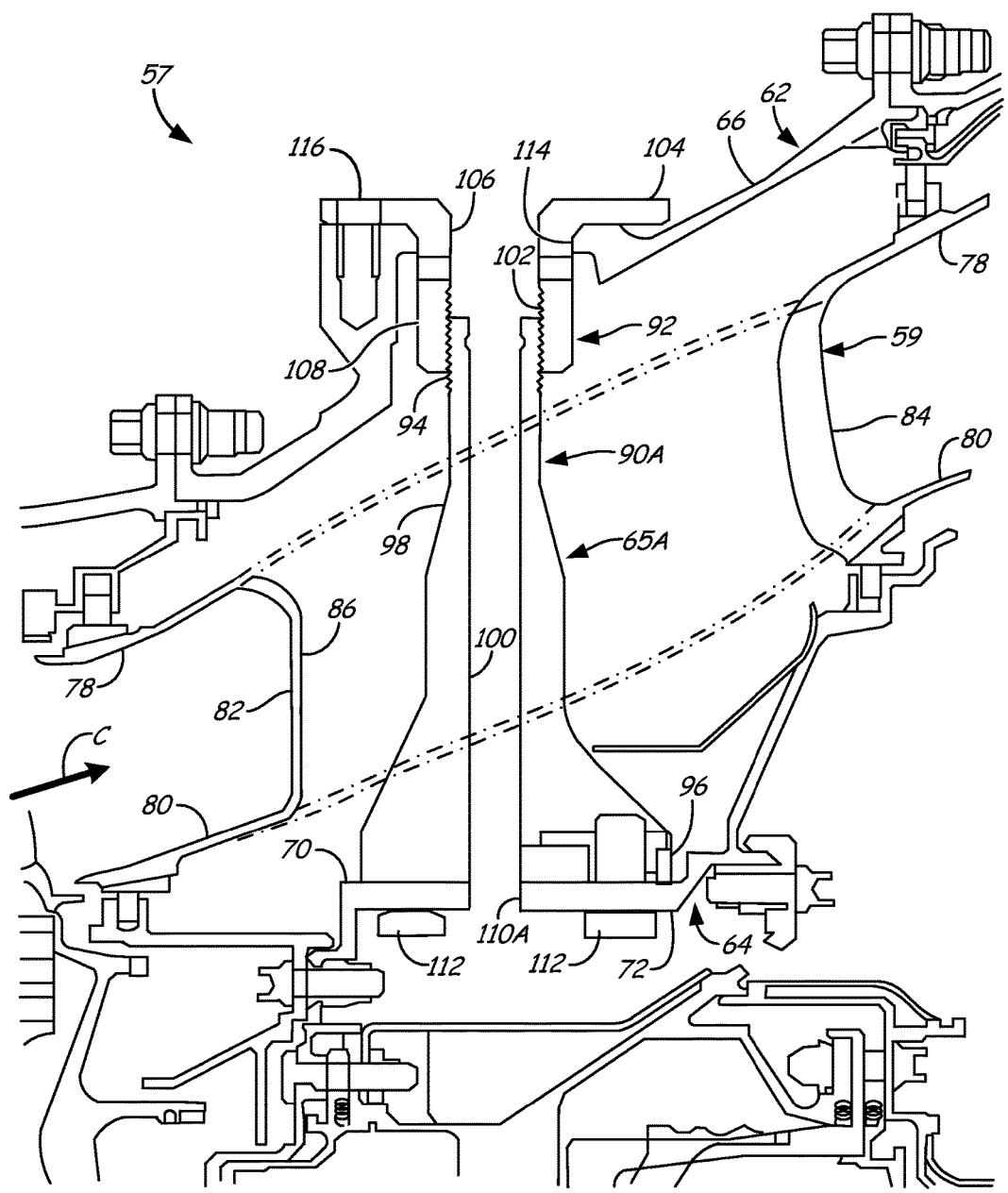
FIG. 3A is a cross-sectional view of one embodiment of the mid turbine frame (MTF) taken along line 3-3 of FIG. 2A.

FIG. 3A is a cross-sectional view of an embodiment of MTF 57 taken along line 3-3 of FIG. 2A. Hollow spoke 65A is one embodiment of one of hollow spokes 65 shown in FIGS. 2A and 2B. Hollow spoke 65A extends from outer frame case 62 through airfoil 59 to inner frame case 64. Airfoil 59 extends from outer platform 78 to inner platform 80. In the illustrated embodiment, airfoil 59, outer platform 78, and inner platform 80 are integrally formed, and are all positioned radially inward of outer frame case 62 and radially outward of inner frame case 64. Airfoil 59, outer platform 78, and inner platform 80 define a portion of core flowpath C at MTF 57. Airfoil 59 extends axially from leading edge 82 to trailing edge 84. Airfoil 59 is oblong so as to be longer in the axial direction than in the circumferential direction. Airfoil 59 has a hollow interior 86, which is also relatively narrow in a circumferential direction.

In the illustrated embodiment, hollow spoke 65A includes tie rod 90A and retaining nut 92. Tie rod 90A is an elongated hollow tube that includes threaded surface 94 at a radially outer end and flange 96 at a radially inner end. Threaded surface 94 is on outer surface 98 of tie rod 90A. Inner passage surface 100 of tie rod 90A defines a hollow passage through tie rod 90A. Tie rod 90A tapers along its length from flange 96 at its radially inner end to threaded surface 94 at its radially outer end.

Retaining nut 92 includes threaded surface 102 at a radially inner end of retaining nut 92 and flange 104 at a radially outer end of retaining nut 92. Threaded surface 102 is on inner surface 106 of retaining nut 92. Flange 104 extends outward from outer surface 108 of retaining nut 92.

In the illustrated embodiment, flange 96 of tie rod 90A abuts against inner frame case 64 so that inner passage surface 100 aligns with hole 110A of inner frame case 64. Flange 96 is attached to inner frame case 64 via bolts 112. Retaining nut 92 extends through hole 114 in outer frame case 62 such that flange 104 abuts against outer diameter surface 66 of outer frame case 62. Flange 104 is attached to outer frame case 62 via bolt 116. Bolt 116 extends through flange 104 into outer frame case 62. Tie rod 90A is threaded into retaining nut 92 so as to attach tie rod 90A to retaining nut 92. In the illustrated embodiment, a portion but not all of threaded surface 94 overlaps with a portion but not all of threaded surface 102.

Figure 3C:
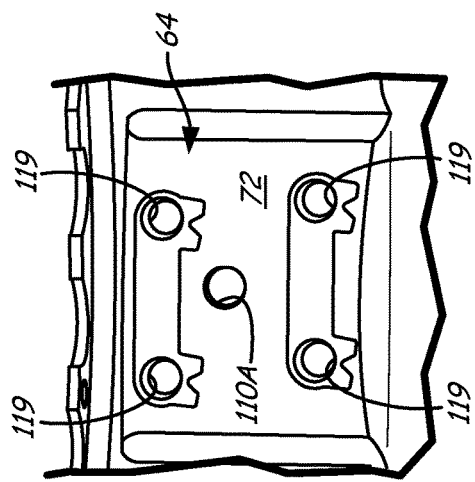
FIG. 3C is a bottom view of the inner frame case of the mid-turbine frame (MTF) of FIGS. 3A and 3B.
Figure 3B:
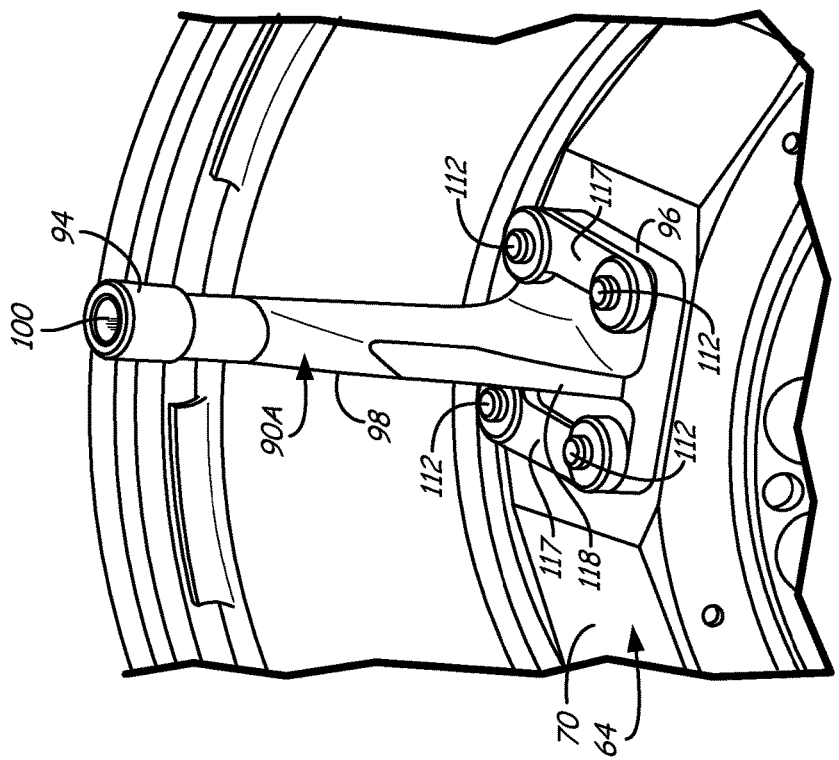
FIG. 3B is a perspective view of a tie rod and inner frame case of the mid-turbien frame (MTF) of FIG. 3A.

FIG. 3B is a perspective view of tie rod 90A and inner frame case 64. FIG. 3B shows flange 96 being connected to inner frame case 64 via four bolts 112. Two bolts 112 are threadedly engaged with each of dogbone retainers 117. Tie rod 90A includes rib 118 providing structural support for tie rod 90A in an axial direction, with respect to engine central longitudinal axis A (shown in FIG. 1). Tie rod 90A is relatively wide in the axial direction (with respect to engine central longitudinal axis A) and relatively narrow in a circumferential direction. This allows tie rod 90A to be inserted through hollow interior 86 of airfoil 59, which is also relatively wide in the axial direction and relatively narrow in the circumferential direction.

FIG. 3C is a bottom view of inner diameter surface 72 of inner frame case 64. Bolt holes 119 extend through inner frame case 72 in an asymmetric pattern about hole 110A. Bolts 112 (shown in FIGS. 3A and 3B) extend through bolt holes 119 to attach tie rod 90A to inner frame case 64. The asymmetric pattern of bolt holes 119 provides a keying function that allow tie rod 90A to be attached only in a single configuration. For example, if tie rod 90A were positioned such that inner passage surface 100 were aligned with hole 110A, then bolts 112 will be able to be passed through all four bolt holes 119 only when tie rod 90A is oriented in a single, designated orientation. This provides a mistake-proofing function for tie rod 90A.

During assembly, tie rod 90A is inserted through hollow interior 86 of airfoil 59 in a direction from radially inward to radially outward. Inner frame case 64 is then positioned radially inward of tie rod 90A and attached to tie rod 90A by bolts 112. Retaining nut 92 is then inserted through hole 114 and threadedly engaged with tie rod 90A. Retaining nut 92 can be tightened, as desired, in a manner described below. Once retaining nut 92 is suitably tightened on tie rod 90A, bolt 116 is inserted to fix retaining nut 92 to outer frame case 62 so as to prevent retaining nut 92 from rotating and loosening.

Because threaded surface 94 overlaps with threaded surface 102 only partially, the threaded connection between retaining nut 92 and tie rod 90A is variable. Retaining nut 92 does not bottom out at any particular point when threaded on tie rod 90A. This allows retaining nut 92 to be threaded on tie rod 90A to an extent determined during assembly, not predetermined prior to assembly. This allows hollow spoke 65A, and MTF 57 in general, to be relatively insensitive to manufacturing tolerances.

Figure 4A:
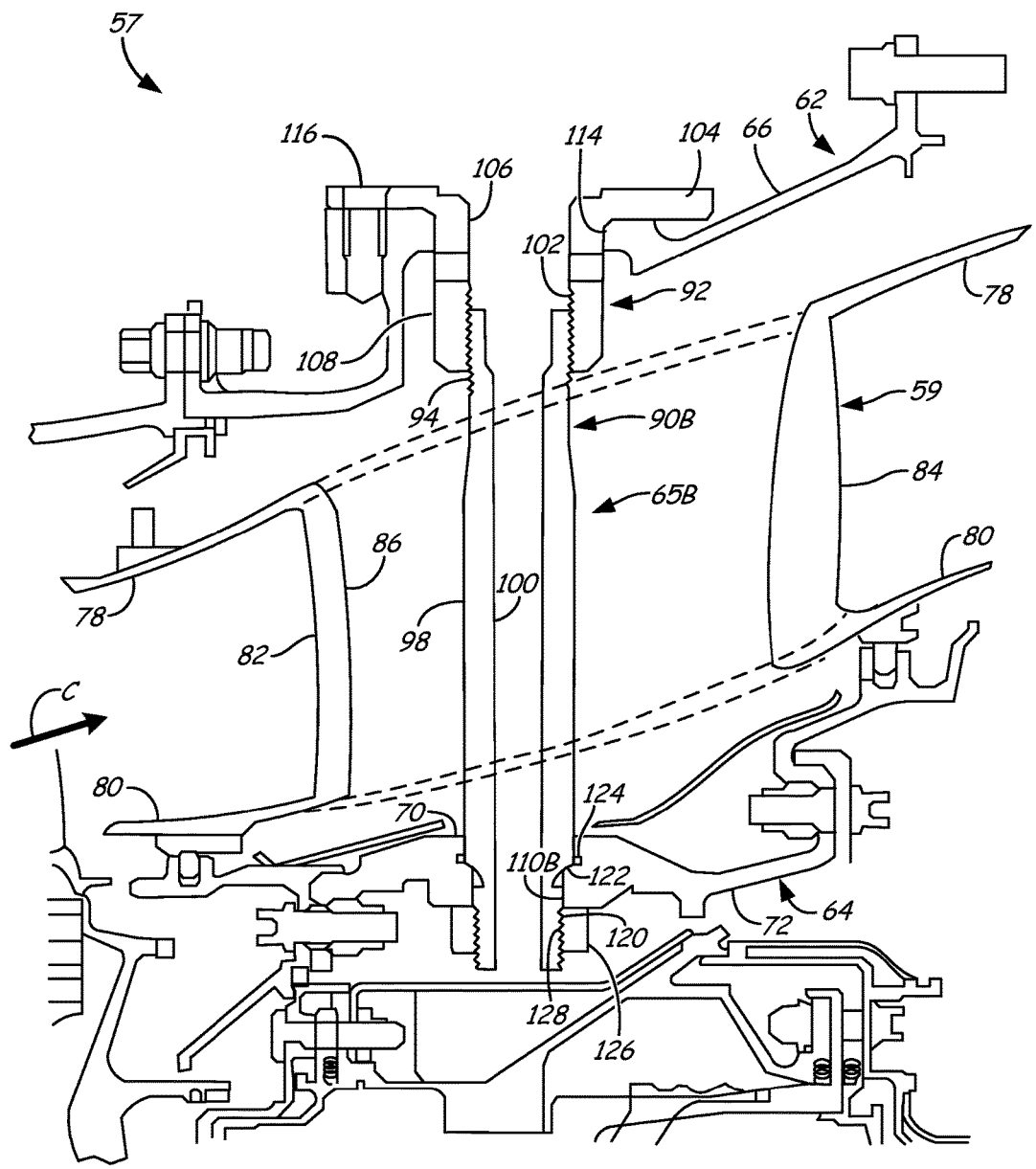
FIG. 4A is a cross-sectional view of another embodiment of the mid-turbine frame (MTF) taken along line 3-3 of FIG. 2A.

FIG. 4A is a cross-sectional view of another embodiment of MTF 57 taken along line 3-3 of FIG. 2A. In the embodiment illustrated in FIG. 4A, hollow spoke 65B, tie rod 90B, and hole 110B replace hollow spoke 65A, tie rod 90A, and hole 110A (shown in FIG. 3A), respectively. Tie rod 90B differs from tie rod 90A in that tie rod 90B tapers only slightly (and does not substantially taper) along its length from threaded surface 120 at its radially inner end to threaded surface 94 at its radially outer end. Tie rod 90B is an elongated hollow and slender tube. Tie rod 90B extends through hole 110B of inner frame case 64, with abutment surface 122 of tie rod 90B abutting abutment surface 124 of inner frame case 64. Retaining nut 126 has threaded surface 128 engaged with threaded surface 120 of tie rod 90B. Retaining nut 126 and threaded surface 120 are positioned radially inward of inner frame case 64. Threaded surface 94 is positioned radially between inner frame case 64 and outer frame case 62. Thus, hollow spoke 65B extends through hole 114 in outer frame case 62 and through hole 110B in inner frame case 64.

FIG. 4B is a side view of tie rod 90B. Tie rod 90B is shown without being attached to inner frame case 64, outer frame case 62, or retaining nuts 92 and 126.

FIG. 4C is a sectional view of tie rod 90B taken along line 4C-4C of FIG. 4B. At the section of FIG. 4C, tie rod 90B has axial width $W_{A-1}$ and circumferential width $W_{C-1}$, as defined with respect to engine central longitudinal axis A (shown in FIG. 1). In the illustrated embodiment, axial width $W_{A-1}$ is substantially greater than circumferential width $W_{C-1}$. By having a relatively large axial width $W_{A-1}$, tie rod 90B can have a relatively large bending strength in an axial direction. By having a relatively small circumferential width $W_{C-1}$, tie rod 90B can be inserted through hollow interior 86 of airfoil 59 (shown in FIG. 4A), which is also relatively wide in the axial direction and relatively narrow in the circumferential direction.

FIG. 4D is a sectional view of tie rod 90B taken along line 4D-4D of FIG. 4B. At the section of FIG. 4D, tie rod 90B has axial width $W_{A-2}$ and circumferential width $W_{C-2}$, with respect to engine central longitudinal axis A (shown in FIG. 1). In the illustrated embodiment, axial width $W_{A-2}$ is greater than circumferential width $W_{C-2}$, which can provide a keying function when inserted in a socket (shown in FIG. 4E) having a corresponding shape.

FIG. 4E is a top view of outer diameter surface 70 of inner frame case 64, having socket 130 positioned adjacent hole 110B. Socket 130 includes abutment surface 124 for abutting against abutment surface 122 of tie rod 90B (shown in FIGS. 4A and 4B). Socket 130 has a size and shape corresponding to abutment surface 122 of tie rod 90B (see FIG. 4D) so as to provide a keying function when tie rod 90B is inserted in socket 130. This provides a mistake-proofing function allowing tie rod 90B to only be installed in designated orientations. In the illustrated embodiment, tie rod 90B is symmetrical, which allows it to be installed in two, opposite orientations. However, the keying function provided by the shapes of socket 130 and outer surface 98 of tie rod 90B can prevent tie rod 90B from being installed in any other orientation. In alternative embodiments, socket 130 and outer surface 98 of tie rod 90B can be shaped so as to allow tie rod 90B to be installed in only a single orientation.

During assembly, airfoil 90 is positioned between outer frame case 62 and inner frame case 64 such that hole 114, hollow interior 86, and hole 110B are substantially aligned. Then, tie rod 90B is inserted through hole 114, hollow interior 86, and hole 110B in a direction from radially outward to radially inward. Tie rod 90B is slid into hole 110B until abutment surface 122 bottoms out against abutment surface 124. If tie rod 90B is not aligned with socket 130, tie rod 90B can be rotated until it is aligned with socket 130. Retaining nut 126 is then threaded on tie rod 90B until retaining nut 126 bottoms out against inner frame case 64. Retaining nut 126 is tightened to hold abutment surface 122 against abutment surface 1124 and fixedly attach tie rod 90B to inner frame case 64. Retaining nut 92 is then inserted through hole 114 and threadedly engaged with tie rod 90B. Retaining nut 92 can be tightened, as desired, in a manner described below. Once retaining nut 92 is suitably tightened on tie rod 90B, bolt 116 is inserted to fix retaining nut 92 to outer frame case 62 so as to prevent retaining nut 92 from rotating and loosening.

Because threaded surface 94 overlaps with threaded surface 102 only partially, the threaded connection between retaining nut 92 and tie rod 90B is variable. Retaining nut 92 does not bottom out at any particular point when threaded on tie rod 90B. This allows retaining nut 92 to be threaded on tie rod 90B to an extent determined during assembly, not predetermined prior to assembly. This allows hollow spoke 65B, and MTF 57 in general, to be relatively insensitive to manufacturing tolerances.

Though FIGS. 3A and 4A each show a single hollow spoke 65 (hollow spokes 65A and 65B), they are one of several hollow spokes 65 spaced circumferentially around MTF 57 (shown in FIGS. 2A and 2B). As each of hollow spokes 65 are tightened, inner frame case 64 can move slightly with respect to outer frame case 62. Hollow spokes 65 can be tightened in a manner that they collectively center inner frame case 64 with respect to outer frame case 62 relatively precisely.

For example, in one embodiment, outer frame case 62 and inner frame case 64 can be designed to be centered and coaxial within 5 thou (5 thousandths of an inch or 0.005 inch or 5 mils or 0.127 mm, millimeter). If each of outer frame case 62, inner frame case 64, tie rod 90, and retaining nut 92 are also manufactured to a tolerance of +/−5 thou (0.127 mm), they could combine to have a variance of +/−20 thou (0.508 mm). However, because the threaded connection between retaining nut 92 and tie rod 90 is variable, retaining nut 92 can be tightened or loosened as necessary to account for the combined variance due to tolerances of individual parts. This allows tie rod 90, retaining nut 92, and other components of MTF 57 to be manufactured with relatively loose individual tolerances, yet still combine to form a structure with relatively tight tolerances. This can reduce the overall cost of manufacture of MTF 57. In other embodiments, each of outer frame case 62, inner frame case 64, tie rod 90, and retaining nut 92 can be manufactured to a tolerance of +/−5 thou (0.127 mm) or greater, while outer frame case 62 can be centered with inner frame case 64 with a tolerance of +/−5 thou (0.127 mm) or less. In still other embodiments, various components can have tolerances not specifically listed above.

Retaining nuts 92 can be rotated and tightened on tie rods 90A and 90B causing hollow spokes 65 have a sufficient initial tension so that hollow spokes 65 remain in tension during all operating conditions. For example, MTF 57 can experience a wide variation in temperatures ranging between relatively cool temperatures when gas turbine engine 20 is not operating and relatively hot temperatures when gas turbine engine 20 is operating at a high speed. Because MTF 57 includes components having different shapes, made of different materials, and exposed to different temperatures, such components can expand and contract at different rates when heated and cooled. For example, if an operating condition causes inner frame case 64 to expand more than outer frame case 62, then the tension on hollow spoke 65 can be reduced. If tension on hollow spoke 65 were reduced to zero (reaching or passing a "null line"), MTF 57 could become imbalanced and cause substantial damage to bearings 38 (shown in FIG. 1) and/or other components on gas turbine engine 20. By tightening hollow spokes 65 to a tension that allows them to remain in tension during substantially all operating conditions, gas turbine engine 20 can avoid damage caused by a loss of tension in hollow spokes 65. Moreover, because hollow spokes 65 remain in tension, they are not subjected to damage caused by mechanical fatigue from cycling between tension and compression.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, retaining nut 92 and tie rods 65A and 65B can be sized and shaped as appropriate for a particular application. Additionally, MTF 57 can be used in a gas turbine engine different than gas turbine engine 20, and can be modified as appropriate for that engine.

The invention claimed is:

1. A method of assembling a mid-turbine frame for use in a gas turbine engine axially aft of a high-pressure turbine and fore of a low-pressure turbine, the method comprising:
   inserting at least a first tie rod through at least a first airfoil;
   positioning first and second frame cases on opposite sides of the airfoil such that one of the first and second frame cases is radially outward of the airfoil and the other of the first and second frame cases is radially inward of the airfoil; and
   attaching a first end of the tie rod to the first frame case at a keyed connection;
   attaching a second end of the tie rod to the second frame case via a threaded retaining nut, wherein the threaded retaining nut extends completely through a thickness of the second frame and beyond the second frame such that the retaining nut does not bottom out when threaded on the second end of the tie rod.

2. The method of claim 1, wherein the first tie rod is one of a plurality of tie rods, wherein the first airfoil is one of a plurality of airfoils, wherein the keyed connection is one of a plurality of keyed connections, and wherein the threaded retaining nut is one of a plurality of threaded retaining nuts, the method further comprising:
   tightening the threaded retaining nuts on the plurality of tie rods to center the first frame case with the second frame case.

3. The method of claim 2, and further comprising:
   inserting the threaded retaining nuts through holes in the second frame case prior to threading the threaded retaining nuts on the tie rods, wherein the holes extend completely through the thickness of the second frame and the threaded retaining nuts extend completely through the holes.

4. The method of claim 1, wherein the first tie rod extends through a hole in the first frame case after being attached to the first frame case.

5. The method of claim 1, wherein the tie rod has an axial width greater than a circumferential width.

6. The method of claim 1, wherein the keyed connection allows the tie rod to be installed in only a preferential orientation.

7. The method of claim 1, wherein the keyed connection comprises a socket in the first frame case having a shape corresponding to an outer surface of the tie rod.

8. The method of claim 7, wherein inserting the tie rod comprises inserting the tie rod until an abutment surface of the tie rod abuts an abutment surface positioned in the socket.

9. The method of claim 7, wherein the first frame case is an inner frame case and the second frame case is an outer frame case, and further comprising:
inserting the tie rod through a hole in the outer frame case prior to inserting the tie rod through its corresponding airfoil.

10. The method of claim 9, and further comprising:
inserting an end of the tie rod through a hole in the inner frame case after inserting the tie rod through its corresponding airfoil.

11. The method of claim 7, wherein the threaded retaining nut is a first threaded retaining nut, and further comprising:
attaching a second threaded retaining nut to the first end of the tie rod.

12. The method of claim 1, wherein the keyed connection comprises a plurality of bolts extending through a plurality of bolt holes in a flange of the tie rod.

13. The method of claim 12, wherein the plurality of bolt holes have an asymmetric pattern that allows the tie rod to be installed in only a preferential orientation.

14. A gas turbine engine comprising:
a combustor;
a first turbine section in fluid communication with the combustor;
a second turbine section in fluid communication with the first turbine section; and
a mid-turbine frame located axially between the first turbine section and the second turbine section, the mid-turbine frame comprising:
a first frame case;
a second frame case positioned radially outward from the first frame case;
a vane positioned between the first frame case and the second frame case; and
a spoke extending through the vane and connecting the first frame case to the second frame case, wherein the spoke comprises:
a tie rod having a first end connected to the first frame case at a keyed connection;
a retaining nut threaded on a second end of the tie rod to connect the tie rod to the second frame case, wherein the retaining nut extends completely through a through hole formed in the second frame case and beyond the second frame case such that the retaining nut does not bottom out when threaded to the second end of the tie rod.

15. The gas turbine engine of claim 14, wherein the keyed connection comprises a socket in the first frame case having a shape corresponding to an outer surface of the tie rod.

16. The gas turbine engine of claim 15, wherein the first end of the tie rod extends through a hole in the first frame case, wherein the tie rod has a first abutment surface abutting a second abutment surface of the socket in the first frame, and wherein a retaining nut is threaded on the first end of the tie rod to hold the first abutment surface against the second abutment surface.

17. The gas turbine engine of claim 14, wherein the keyed connection comprises a plurality of bolts extending through a plurality of bolt holes in a flange of the tie rod.

18. The gas turbine engine of claim 17, wherein the plurality of bolt holes have an asymmetric pattern that allows the tie rod to be installed in only a preferential orientation.

* * * * *